Sept. 16, 1969  C. R. BERGEVIN  3,466,906
WIRE FEED CONTROL MECHANISM FOR SPRING COILING MACHINE
Filed Sept. 25, 1967  5 Sheets-Sheet 1

INVENTOR:
CHARLES R. BERGEVIN

BY Steward & Steward his ATTORNEYS.

Sept. 16, 1969  C. R. BERGEVIN  3,466,906
WIRE FEED CONTROL MECHANISM FOR SPRING COILING MACHINE
Filed Sept. 25, 1967  5 Sheets-Sheet 3

INVENTOR:
CHARLES R. BERGEVIN

BY *Steward & Steward* his ATTORNEYS.

Sept. 16, 1969 C. R. BERGEVIN 3,466,906
WIRE FEED CONTROL MECHANISM FOR SPRING COILING MACHINE
Filed Sept. 25, 1967 5 Sheets-Sheet 4

INVENTOR:
CHARLES R. BERGEVIN

BY Steward + Steward his ATTORNEYS.

INVENTOR:
CHARLES R. BERGEVIN

BY Steward & Steward his ATTORNEYS

United States Patent Office 3,466,906
Patented Sept. 16, 1969

3,466,906
WIRE FEED CONTROL MECHANISM FOR SPRING COILING MACHINE
Charles R. Bergevin 28 West View Terrace,
Torrington, Conn. 06790
Filed Sept. 25, 1967, Ser. No. 670,344
Int. Cl. B21b *31/34, 39/02;* B65h *51/00*
U.S. Cl. 72—36                                             8 Claims

ABSTRACT OF THE DISCLOSURE

A mechanism for adjusting the amount of wire feed during each spring forming cycle of a machine for coiling helical springs, which employs a segment gear for rotating the wire feed rolls. The segment gear is pivoted through a predetermined arc by a crank pin on a crank gear. The crank pin can be moved radially of the crank gear by means of a worm gear which is fixed to a rotatable rod extending from the crank gear to an external portion of the machine where it is readily accessible to the operator.

---

This invention relates to spring coiling machines, and it relates more particularly to means for adjusting the length of wire fed during each spring-forming cycle.

In the manufacture of wire springs, the number of identical springs to be made at any particular time is usually relatively small. This condition of necessity makes the machine set-up time a major part of the cost of the product. In most spring-manufacturing plants about 80% of the orders for springs are in quantities of 5,000 or less. Furthermore, almost every order at any particular time is for springs of different specifications. Spring coiling machines commonly in use today require an average set-up time of about two hours. Since these machines are capable of producing approximately 6,000 springs per hour, it takes the machine only one minute to turn out an order for 100 springs—but two hours time may have been required to set-up the machine. Set-up time is therefore the major factor in the cost of production.

A general object of the present invention is therefore to reduce the amount of time required to set-up wire-spring coiling machines in order to reduce costs.

The spring coiling machine to which the invention relates is known as the "segment" type, the basic design for which is shown in the patent to Bergevin et al. 2,119,002 and Franks 3,009,505. This type of machine gets its name from the fact that the mechanism for feeding the wire to the coiling tools includes a pivoted segment gear which is rocked back and forth, intermittently feeding the wire lengthwise with each stroke of the segment in one direction. The segment gear is driven by a bull gear through a crank pin that slides in a radial slot in the segment. The angle through which the segment is rocked with each rotation of the bull or crank gear depends on the position radially of the bull gear that the crank pin is located on the bull gear. It is conventional practice in machines of this type to mount the crank pin on the bull gear so that it can be shifted transversely thereof nearer to, or farther from, its central axis, thereby changing the arc through which the segment gear is moved. The arc or stroke of the segment gear determines the amount of wire fed during the coiling cycle.

In order to adjust the position of the crank pin on the bull gear, it has been necessary heretofore to make the adjustment at the bull gear inside the machine. This requires rotating the bull gear until the adjusting screws are accessible, loosening a lock screw, turning a feed adjusting screw having necessarily rather finely pitched threads and then tightening the lock screw again. Each adjustment for feed has therefore taken an exhorbitant amount of time because of the inaccessability of the adjusting screw. Moreover, since it is frequently impossible to know in advance exactly how much wire is needed for any particular spring, the adjustment for feed may have to be made five or six times before the required length of wire is obtained. A great deal of guesswork has accordingly been required in order to know how much adjustment should be made each time.

It is a specific object of the present invention to provide means by which the crank pin can be adjusted from a convenient point that is remote from the bull gear and segment gear, preferably at the front of the machine where the operator makes adjustments in the coiling tools and other parts of the machine. Another specific object is to reduce the guesswork involved in at least knowing how much wire will be fed for any particular setting of the crank pin.

In general the invention resides in the provision of an adjusting rod which is geared to the adjusting screw on the crank or bull gear for shifting the crank pin radially of the crank gear, the adjusting rod being mounted within a hollow crank shaft and extending from the crank gear to an external portion of the machine for easy access by the operator when adjusting the length of wire that is fed to the coiling tools. More specifically, the invention contemplates the use of a worm gear on the adjusting rod at the center or hub of the crank gear such that the worm gear engages external gear teeth on an adjusting nut that is threaded internally onto the adjusting screw. The adjusting screw in turn is fixed to the block on which the crank pin is supported, so that by rotating the adjusting rod in one direction, the adjusting nut is rotated on the adjusting screw driving it lengthwise, so that the crank pin is moved radially of the crank shaft.

In order to lock the crank pin at an adjusted position, a lock nut is threaded onto the adjusting screw immediately adjacent the adjusting nut, so that it can be brought up into rigid locking engagement therewith. Like the adjusting nut, the lock nut can be rotated on the adjusting screw from outside the machine by means of locking rod that is geared to the lock nut and extends through the hollow crank shaft parallel to the adjusting rod. Both the adjusting rod and the locking rod are provided with standard square or hexagonal heads at their outer ends for operation by a suitable hand wrench or electrical power wrench from an accessible point outside the machine.

In addition, a second screw and worm-gear arrangement at the outer end of the adjusting rod moves a pointer along a graduated scale on a dial outside the machine so that when the adjusting rod is turned to change the position of the crank pin, the exact amount of wire fed during each coiling cycle is shown directly on the dial.

Consequently, even though several feed adjustments may be required while the machine is being set-up to produce springs of any desired specification, each adjustment can be made quickly and accurately. Furthermore, because the exact feed setting is readily seen directly on the feed dial outside the machine, the wire feed setting can be made with considerable accuracy at the outset when setting up the machine for springs that have been coiled before.

These and other advantages and features of the present invention will become more apparent from the description hereinafter of one particular embodiment of the invention as illustrated more or less diagrammatically in the accompanying drawings, it being understood that various changes can be made without departing from the scope of the invention as defined in the claims appended hereto.

Figure 1:
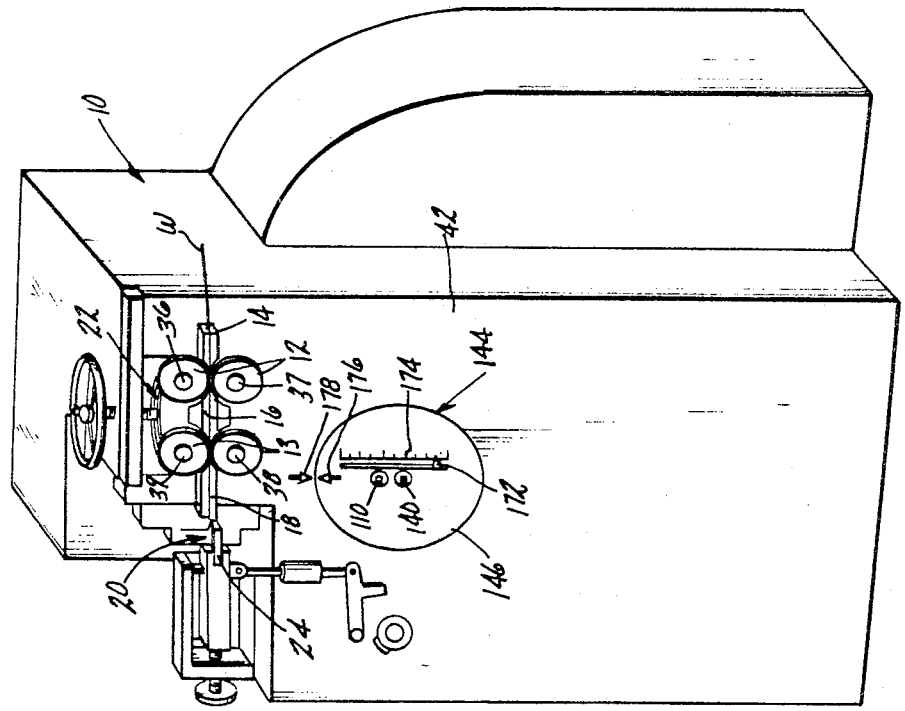
FIG. 1 is a perspective view of a spring coiling machine of the type in which the present invention may be employed.
Figure 2:
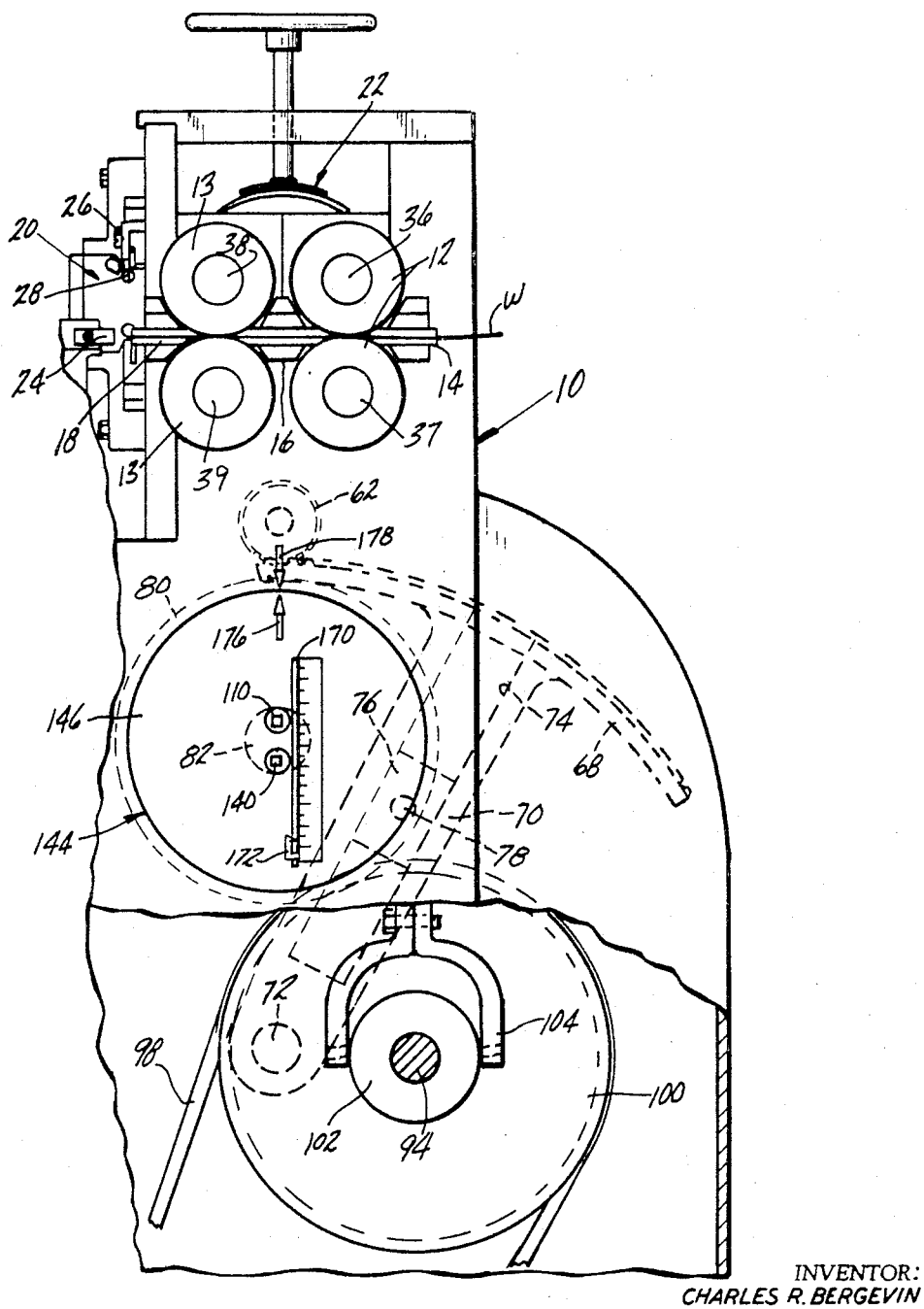
FIG. 2 is a partial front elevational view on a larger scale of the machine shown in FIG. 1, portions of the housing being broken away in order to expose parts inside.

As shown in FIGS. 1 and 2, the machine 10 has two pairs of wire feed rolls 12, 12 and 13, 13 which feed spring wire W from a supply (not shown) through several sets of guide plates 14, 16 and 18 to the coiling tools in the coiling area 20 of the machine. Pressure is exerted on the wire W by adjustable pressure means, indicated generally at 22, which exert the desired pressure on the upper rolls of each pair 12, 12 and 13, 13 so that the wire is fed positively through the final guide plates 18 into engagement with a coiling point 24 which bends it into a coil in the manner described in detail in my copending application Ser. No. 623,954 filed Mar. 17, 1967. When each spring has been coiled the feed rolls 12 and 13 stop so that the spring can be cut from the supply of wire by a cutter 26 against a mandrel 28. An additional length of wire is then fed to form the next spring, which when completed is cut by the cutter 26, this cycle being repeated until the desired number of springs are formed.

The feed rolls 12 and 13 are driven in unison, in this instance by and endless chain 30 (FIG. 3) which is trained over sprockets 32, 33, 34 and 35 fixed on feed-roll shafts 36, 37, 38 and 39, respectively, suitably journaled in the frame of the machine. A take-up sprocket 40 mounted on a pivot-arm 42 removes any slack in drive chain 30. Feed rolls 12 and 13 are mounted on and rotate in unison with shafts 36–39 outwardly of the front wall 42 of the machine, shafts 36–39 being journaled at their front ends in front wall 42 and at their rear ends in an intermediate partition or wall 44 (FIG. 4) spaced from both the front wall 42 and a rear wall 46 of the machine. One of the feed-roll shafts 39 is extended rearwardly through an opening in the rear wall 46 and has a drive gear 48 mashing with another gear 50 on a clutch shaft 52. Feed-roll shaft 39 is journaled at its rear end in a support panel 54 mounted in a rear housing 56 of the machine.

Clutch shaft 52, which is journaled at its rear end in support panel 54 and at its forward end in the intermediate wall 44, is intermittently driven in one direction through a one-way clutch 60 having a pinion 62 that meshes with a gear segment 68 having a radial arm 70 pivoted on a rock shaft 72. A radial slot 74 in arm 70 receives a rectangular slide 76 in which a crank pin 78 is pivoted. Crank pin 78 in turn is eccentrically mounted, as will be described in greater detail hereinafter, on a crank gear 80, so that rotary movement of crank gear 80 is transmitted through crank pin 78 and slide 76 to the segment gear 68, causing the segment gear to oscillate across the face of crank gear 80 and to drive pinion 62 first in one direction and then in the other. For each complete oscillation of segment gear 68, therefore, the clutch shaft 52 is rotated through a predetermined number of degrees of rotation as the segment gear swings in one direction, after which shaft 52 remains stationary as the segment gear swings in the opposite direction, all in the conventional manner of the so-called segment-type spring-coiling machines. A freely rotatable idler sprocket 66 is provided on shaft 52 at a point adjacent drive chain 30. Chain 30 is trained over sprocket 66 so that it does not bear against shaft 52.

Crank gear 80 is mounted at one end of a hollow shaft 82 that is rotatably supported in bearings 84 in intermediate wall 44 and in bearings 86 in the front wall 42 of the machine. A gear 88 is journaled on a stub shaft 90 below crank gear 80 for meshing engagement therewith and for engagement with a pinion 92 fixed at one end of a pulley shaft 94. Shaft 94 is driven by a motor 96 (FIG. 3) through V-belt 98 and a pulley 100. A conventional clutch 102 and clutch lever 104 are provided for disengaging motor 96 when it is desired to shutdown the machine or to shift to manual drive.

Figure 3:
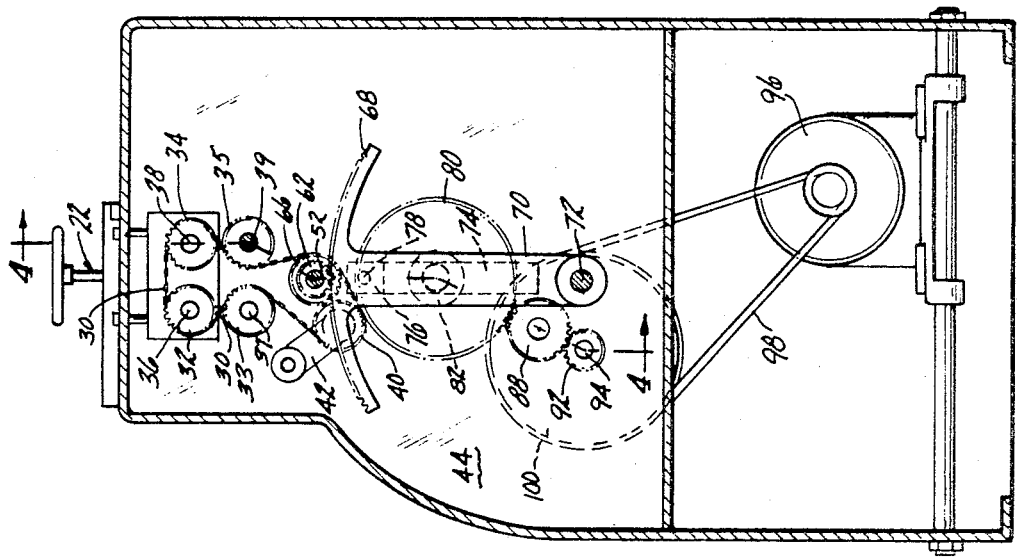
FIG. 3 is a vertical transverse section through the machine taken on the line 3—3 of FIG. 4, looking in the direction of the arrows, the segment gear being shown at its central position.
Figure 4:
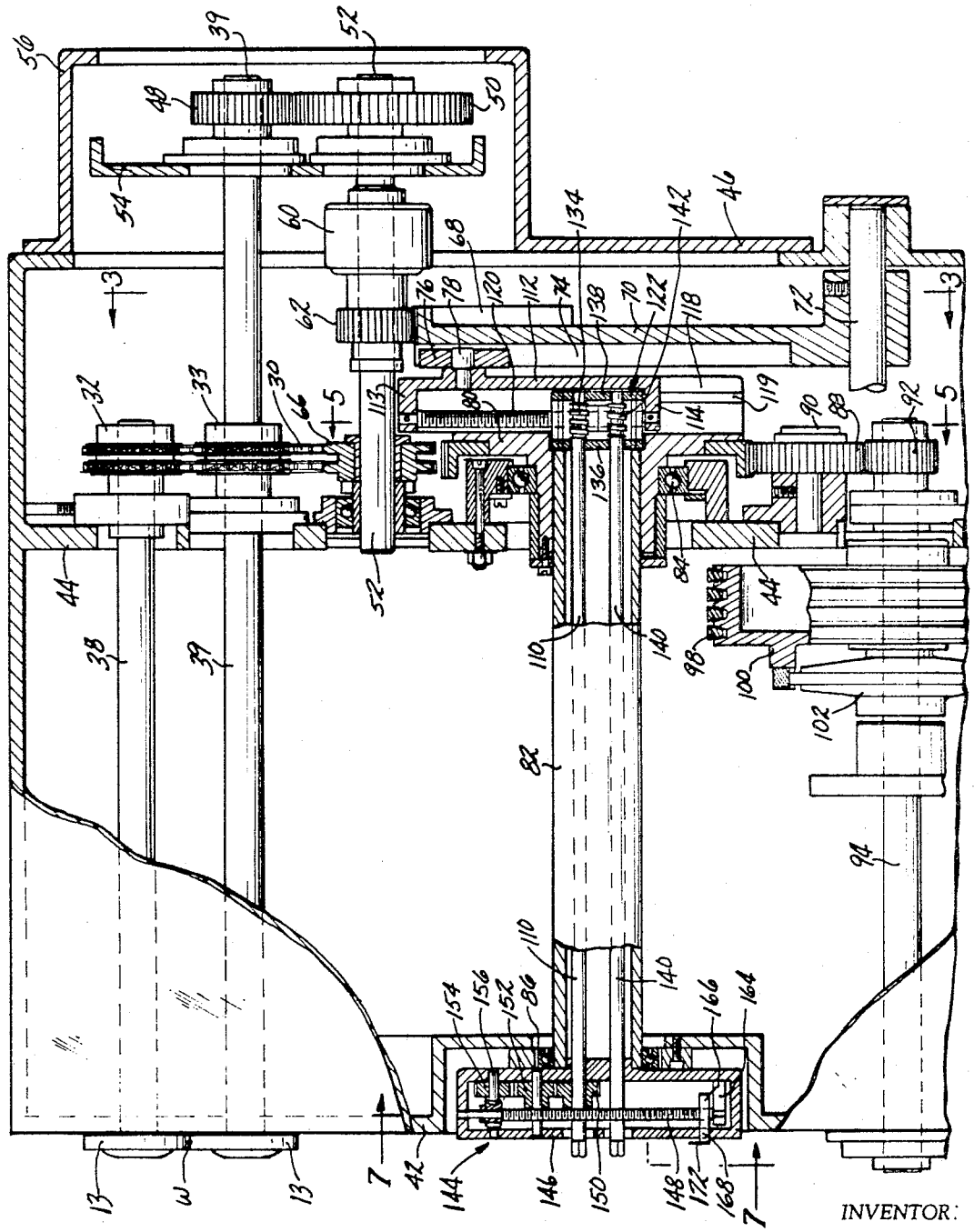
FIG. 4 is a vertical section taken longitudinally through the upper portion of the machine on the line 4—4 of FIG. 3, but on a larger scale.

As in prior segment-type machines, the amount of rotation of the clutch shaft 52 and, therefore, of the amount of wire fed during each cycle is dependent on the position of crank pin 78 radially of crank gear 80. In FIGS. 2–4 crank pin 78 is shown at its outermost position so that it swings segment gear 68 through its full arc. FIG. 2 shows the segment gear 68 at the beginning of its feed stroke, while FIGS. 3 and 4 show it in a vertical position at the midpoint of its feed stroke.

In accordance with the present invention, the radial position of crank pin 78 on crank gear 80 is adjusted from outside the machine by actuating a screw mechanism in the hub of crank gear 80 by means of an adjusting rod 110 which extends through the center of hollow shaft 82 to the front of the machine. As best shown in FIG. 4, crank pin 78 is mounted near one end of a hollow, elongated mounting block or housing 112 having end walls 113, 114 and parallel side walls 115, 116 (FIG. 5) which engage parallel guideways 117, 118 on the face of the crank gear for adjustment along said guideways. Suitable means are provided for retaining mounting block 112 in the guideways 117, 118, such as inwardly extending tracks or flanges 119, 119 on the inner faces of guideways 117, 118 which slide within longitudinal grooves in the sides of block 112.

Figure 5:
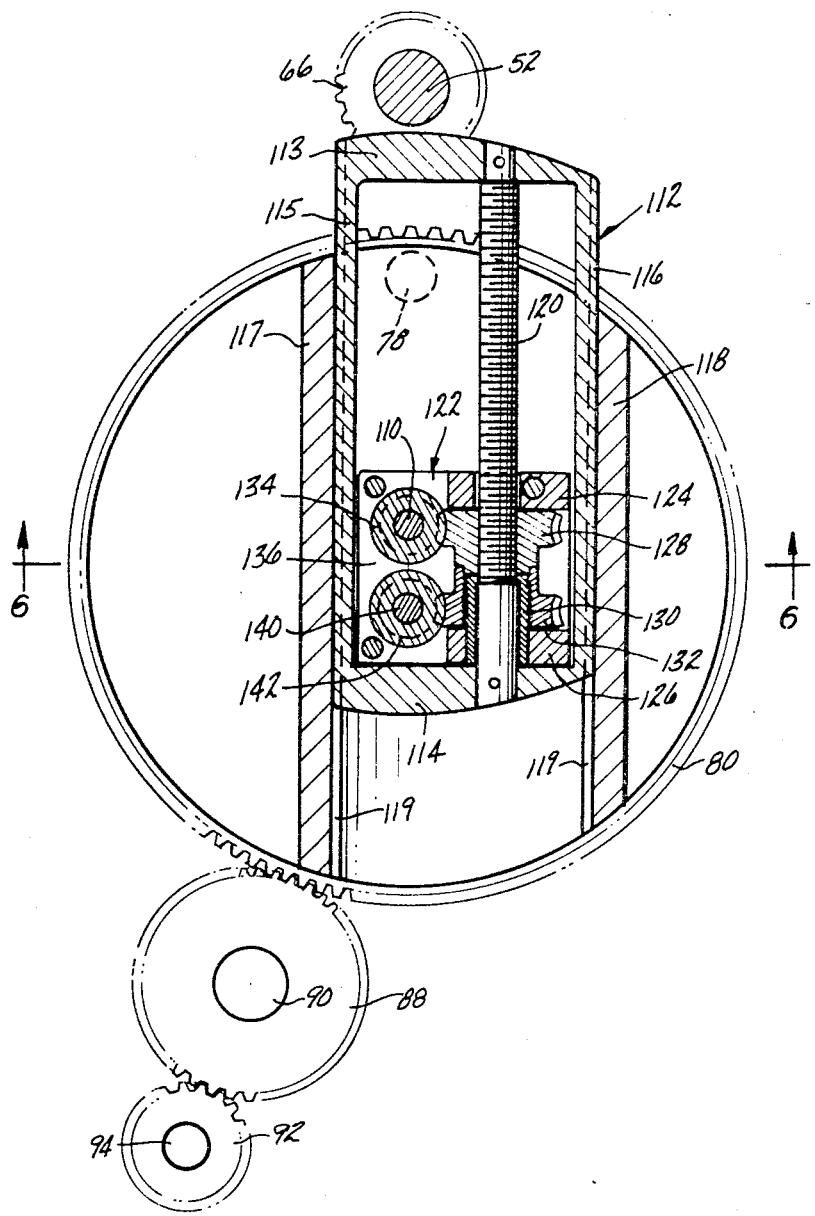
FIG. 5 is a vertical section taken on the line 5—5 of FIG. 4 through the crank pin block and wire feed adjusting mechanism.

An adjusting screw 120 is fixed at both ends within block 112 to the end walls 113, 114 and extends parallel to side walls 115, 116 through a gear box 122 rigidly mounted in the hub of crank gear 80. Gear box 122 is provided with a pair of spaced retaining plates 124 and 126 (FIG. 5) which are fastened to the face of crank gear 80 and project rearwardly therefrom into crank-pin mounting block 112. Plates 124 and 126 have aligned openings through which the adjusting screw 120 extends for movement lengthwise with mounting block 112. An adjusting gear 128 is internally threaded to fit adjusting screw 120 and is positioned between retaining plates 124 and 126 so that rotation of adjusting gear 128 causes screw 120 and crank-pin mounting block 112 to move lengthwise (i.e. vertically as shown in FIGS. 4 and 5).

A spacer sleeve 130 is fixed at one end in the retaining plate 126. The other end of sleeve 130 extends into juxtaposition with the hub portion of adjusting gear 128 in order to prevent it from moving in one direction longitudinally of adjusting screw 120. Sleeve 130 is also threaded externally to receive an internally threaded locking gear 132, rotation of which in one direction will cause it to move axially on sleeve 130 into locking engagement with adjusting gear 128. Adjusting gear 128 is thereby prevented from rotating after the crank pin has been adjusted to the desired position radially of crank gear 80 at which the required amount of wire is fed by the feed rolls 12 during each feed stroke of the segment gear 68. Reverse rotation of locking gear 132 will cause it to back away from adjusting gear 128 in order to unlock it, sufficient space being provided between adjusting gear 128 and the retaining plate 126 for this purpose.

Figure 6:
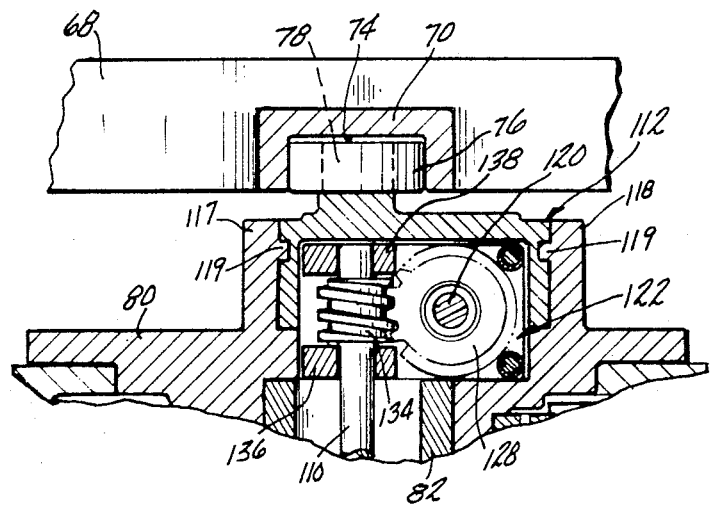
FIG. 6 is a sectional view of the feed adjusting mechanism taken on the line 6—6 of FIG. 5.

Adjusting gear 128 is rotated by a worm gear 134 (FIGS. 5 and 6), which is fixed to the inner end of adjusting rod 110. A pair of bearing blocks 136 and 138, one on each side of worm gear 134, support it in meshpin radially of said crank for calibrating the length of wire fed for each setting of said crank pin, said indexing mechanism including a pointer geared to said adjusting rod for movement on rotation of said adjusting rod.

7. The combination defined in claim 6, wherein said indexing mechanism further includes an indicator screw mounted for rotation only, means for rotating said indicator screw upon rotation of said adjusting rod, a follower nut threaded on said indicator screw, and means for preventing rotation of said follower nut with respect to said indicator screw, said pointer being mounted on said follower nut for movement therewith longitudinally of said indicator screw.

8. The combination defined in claim 1, which further includes a locking nut threaded co-axially with said adjusting screw for locking said crank pin mounting block in place, and a locking rod geared to said locking nut and extending longitudinally through said crank shaft to the exterior of the machine.

References Cited

UNITED STATES PATENTS

| | | | |
|---|---|---|---|
| 1,266,070 | 5/1918 | Sleeper | 72—132 |
| 2,170,984 | 8/1939 | Bergevin et al. | 72—133 |

CHARLES W. LANHAM, Primary Examiner

L. A. LARSON, Assistant Examiner

U.S. Cl. X.R.

72—133; 226—142 ing engagement with the external teeth of adjusting gear 128. Bearing blocks 136 and 138 are rigidly secured to the hub portion of crank gear 80 and form a part of the supporting frame for the gear box 122.

Locking gear 132 is likewise operable from outside the machine by a second rod 140 which is supported lengthwise within the hollow shaft 82 and extends from the gear box 122 to the front of the machine. The inner end of rod 140 is journaled in bearing blocks 136 and 138 with a second worm gear 142 fixed to rod 140 for meshing engagement with the teeth of locking gear 132.

The outer ends of the adjusting rod 110 and locking rod 140 are supported in the rear vertical wall of a cylindrical housing or drum 144, which is fixed to the outer end of shaft 82 and rotatable therewith. The ends of both rods 110 and 140 extend through enlarged openings in a dial or face 146 at the front of housing 144 and are provided with square heads to which a hand crank or power wrench can be attached, so that they can be readily rotated.

Figure 7:
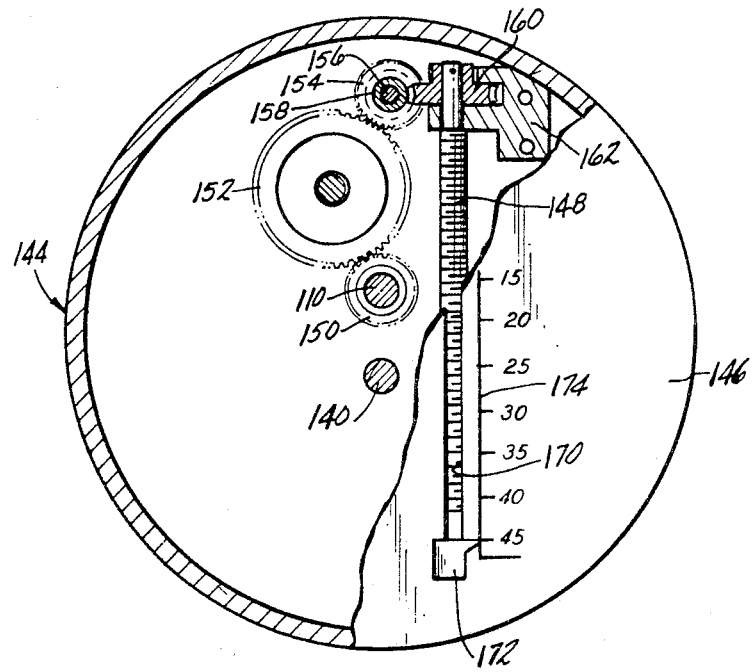
FIG. 7 is an enlarged section taken on the line 7—7 of FIG. 4.

The drum 144, which rotates with the crank shaft 82, is recessed within the front wall 42 of the machine and contains mechanism for accurately indicating on the dial 146 the amount of wire that is fed with each stroke of the gear segment 68. To this end, a screw 148 corresponding to the adjusting screw 120 is rotated each time rod 110 is operated. A gear 150 fixed at the outer end of rod 110 meshes with a larger gear 152 which in turn meshes with a gear 154 fixed to a shaft 156. A worm gear 158, which rotates on shaft 156 in unison with gear 154, meshes with a gear 160 at one end of screw 148. Screw 148 is mounted within drum 144 for rotation in a bracket 162 at one end (FIG. 7) and a bracket 164 at its other end (FIG. 4). Brackets 162 and 164 prevent screw 148 from moving axially. A follower nut 166 is threaded onto screw 148 and is provided with a finger 168 which extends laterally therefrom through a slot 170 in the dial 146. Nut 166 is prevented from rotating by engagement of its finger 168 in slot 170, so that the nut will travel along the slot when screw 148 is rotated during adjustment of the wire-feed mechanism.

A pointer 172 at the outer end of finger 168 on follower nut 166 indicates on a scale 174 adjacent slot 170 the length of wire that will be fed during each spring coiling cycle of the machine. It will be understood of course that where change-gears are provided for increasing or decreasing the amount of wire fed with each stroke, graduated scales will be provided on the dial for each set of gears. In the present case, only a single set of feed gears 48 and 50 and one indicator scale 174 are shown.

From the foregoing, it will be seen that adjustment for the length of wire to be fed during each spring coiling cycle is readily made at the front of the machine. A wrench is applied to the locking rod 140 in order to unlock the adjusting nut 128. An electric power wrench may then be connected to the adjusting rod 110 and operated to move the crank pin 78, shown in phantom in FIG. 5, toward or away from the center of crank gear 80 in order to increase or decrease the stroke of segment gear 68, which in turn increases or decreases the amount of rotation of feed rolls 12, 13 through feed gears 48 and 50 and one-way clutch 60. The length of the wire fed at any setting of the crank pin is accurately calibrated on the scale 174 so that the pointer 172 shows the amount of wire that will be fed. The locking rod 140 is then rotated in order to lock the feed adjusting screw 120 at the desired setting. When the arrows 176 and 178 (FIGS. 1 and 2) on the dial 146 and front wall, respectively, of the machine are lined up as illustrated, the segment gear 68 is positioned at the start of its feeding stroke. The large indicator dial 146 on the crank shaft 82 therefore provides a convenient way of locating this position.

It will be seen from the foregoing that by providing means for adjusting the wire feed at the front of the machine, the time required in making this adjustment can be greatly reduced.

What is claimed is:

1. In a spring coiling machine having a frame, wire-feed rolls, a continuously rotating crank, a pivotally mounted gear segment for intermittently rotating said wire-feed rolls, and a crank pin movable in a slot in said segment gear and mounted in a block adjustable in transverse ways on said crank in order to vary the length of wire fed by said rolls, the combination comprising:

a hollow crank shaft journaled in said frame with one end extending toward the exterior of the machine, said crank being mounted for rotation with said crank shaft, an adjusting screw mounted on said block for shifting said block in said transverse ways, and an adjusting rod geared to said adjusting screw for rotating said adjusting screw in order to shift said block in said transverse ways, said adjusting rod being mounted within and longitudinally of said hollow crank shaft from said crank to a point remote therefrom at the exterior of the machine.

2. The combination defined in claim 1, wherein said adjusting screw is fixed against rotation within said crank pin mounting block and which further includes an adjusting nut threaded on said adjusting screw for rotation thereon, means for preventing movement of said adjusting nut longitudinally of said adjusting screw so that said adjusting screw and said mounting block are moved axially upon rotation of said adjusting nut, and a worm gear on said adjusting rod for rotating said adjusting nut, said adjusting nut having external gear teeth in meshing engagement with said worm gear for effecting rotation of said adjusting nut upon rotation of said adjusting rod.

3. The combination defined in claim 2, which further includes a locking nut threaded co-axially with said adjusting screw for locking said crank pin mounting block in place, and a locking rod geared to said locking nut and extending longitudinally through said crank shaft to the exterior of the machine.

4. The combination defined in claim 2, which further includes a locking nut threaded co-axially with said adjusting screw for locking said crank pin mounting block in place, a locking rod mounted within and longitudinally of said hollow crank shaft parallel to said adjusting rod, and a second worm gear on said locking rod for rotating said locking nut, said locking nut having external gear teeth in meshing engagement with said second worm gear for effecting rotation of said locking nut upon rotation of said locking rod.

5. The combination defined in claim 4, wherein said means for preventing longitudinal movement of said adjusting nut includes an externally threaded sleeve fixed to said crank and receiving said adjusting screw for axial movement therewithin, said adjusting nut being disposed in juxtaposition with said sleeve such that longitudinal movement of said adjusting nut in one direction is prevented by said sleeve, said locking nut being threaded onto said sleeve for movement longitudinally of said adjusting screw into locking engagement with said adjusting nut.

6. The combination defined in claim 1, which further includes an indexing mechanism at the exterior end of said crank shaft for indicating the position of said crank